United States Patent [19]

Matsui et al.

[11] 4,431,299
[45] Feb. 14, 1984

[54] PROJECTION APPARATUS

[75] Inventors: Yoshiya Matsui; Setsuo Minami; Noritaka Mochizuki, all of Yokohama, Japan

[73] Assignee: Canon Kabushiki Kaisha, Tokyo, Japan

[21] Appl. No.: 134,222

[22] Filed: Mar. 26, 1980

Related U.S. Application Data

[63] Continuation of Ser. No. 889,404, Mar. 23, 1978, abandoned.

[30] Foreign Application Priority Data

| Mar. 31, 1977 | [JP] | Japan | 52-37315 |
| Jul. 8, 1977 | [JP] | Japan | 52-81571 |
| Aug. 3, 1977 | [JP] | Japan | 52-93497 |

[51] Int. Cl.³ ............. G03G 15/28; G03B 27/48
[52] U.S. Cl. ................................. 355/8; 355/1; 355/50
[58] Field of Search ............ 355/1, 3 R, 8, 50, 52, 355/55, 56

[56] References Cited

U.S. PATENT DOCUMENTS

| 3,060,805 | 10/1962 | Brumley | 355/1 X |
| 3,241,438 | 3/1966 | Frank | 355/50 |
| 3,398,669 | 8/1968 | Hicks | 355/1 |
| 3,409,354 | 11/1968 | Frank | 355/1 |
| 3,580,675 | 5/1971 | Hieber et al. | 355/50 |
| 3,584,950 | 6/1971 | Gundlach | 355/50 |
| 3,592,542 | 7/1971 | Kaufer et al. | 355/50 |
| 3,694,076 | 9/1972 | Weber | 355/50 |
| 3,836,249 | 9/1974 | Weber | 355/51 |
| 3,977,777 | 8/1976 | Tanaka et al. | 355/1 |
| 4,129,373 | 12/1978 | Ogura et al. | 355/1 |

OTHER PUBLICATIONS

Wohl, R. J; "Short Length Optical System", IBM Technical Disclosure Bulletin; vol. 13, No. 10, Mar. 1971, p. 2947.

Primary Examiner—Fred L. Braun
Attorney, Agent, or Firm—Fitzpatrick, Cella, Harper & Scinto

[57] ABSTRACT

A projection apparatus for forming an image of original on a photosensitive material opposed to the plane of the original. The projection apparatus has a projecting system composed of a plurality of projection optical system arrays. Each individual projection optical system is composed of a first and a second lens coaxially disposed and having a relatively large length as compared with its effective lens diameter respectively. The first lens is an exit side telecentric lens whereas the second one is an incident side telecentric lens. The first lens forms an intermediate image of a portion of the original on a plane between the first and second lenses and the second lens reforms the intermediate image on the photosensitive material.

26 Claims, 8 Drawing Figures

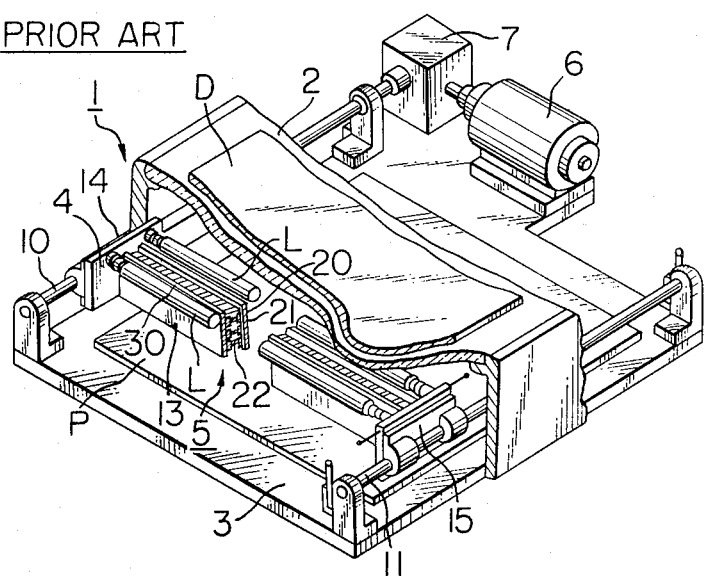

PROJECTION APPARATUS

This is a continuation of application Ser. No. 889,404, filed Mar. 23, 1978, now abandoned.

BACKGROUND OF THE INVENTION

1. Field of the Invention

The present invention relates to a projection apparatus and more particularly to a projection apparatus for forming on a plane of projection a mirror image of an object at unit magnification.

2. Description of the Prior Art

The projection apparatus for forming a mirror image on a projection plane is widely used in copying apparatus and other apparatus containing a transferring step.

The projection apparatus used in the conventional copying machine generally uses a single projection lens system. However, the use of one single projection lens system has a disadvantage that since its conjugate is relatively long, the size of the copying machine employing it becomes inevitably large. To overcome this drawback there has already been proposed such a projection apparatus in which a plural number of lens systems each having a relatively short conjugate are disposed so as to make the individual lens systems take charge of the respective portions of one object to be projected. A complete projection image of the whole object is formed on a projection plane by a composition of these partial images through the plural lens systems.

One example of such a projection apparatus is disclosed in U.S. Pat. No. 3,584,952 granted on June 15, 1971. In the projection apparatus of this patent there are used a plurality of lens systems disposed in rows along the length of each strip area of an original to be copied, so that these lens systems may form, on a photosensitive medium, partial images corresponding to the plural strip areas of the original respectively.

The use of such type of projection apparatus permits the construction of a relatively compact copying machine.

The present invention relates to an improvement in this type of projection apparatus. The improvement made by the present invention resides in that the number of lenses required for composing each lens system is reduced as compared with the apparatus disclosed in the above mentioned patent.

Each lens system used in the projection apparatus disclosed in the above mentioned U.S. Patent is composed of three lenses, that is, front, middle and rear lenses. The front lens serves to form an intermediate image of the corresponding portion of an original on the middle lens interposed between the front and rear lenses. The intermediate image formed on the middle lens is reformed on a photosensitive material through the rear lens. In this system, the middle lens functions only as a field lens and has no relation with the function of projection per se in the nature of lens. However, this field lens is of importance in the point that it keeps the projected image on the photosensitive material at a uniform brightness.

According to the present invention, the number of lenses in an unit lens system is reduced by employing a first and a second lens each having a length along the optical axis larger than the effective diameter thereof.

Such lens the length of which along the optical axis is larger than the effective diameter thereof is disclosed in British Pat. No. 954,629 the complete specification of which was issued on Apr. 8, 1964. But, the apparatus in which such lens is used, is of the type which projects a partial image of object through one single lens system. This apparatus disclosed therein is essentially different from that of the present invention according to which lens system arrays are made so as to form a composite image of an object from many partial images formed by the individual lens systems. Moreover, the lens disclosed in the British Patent is neither a telecentric lens system nor a lens for forming an intermediate image between the first and second lenses. The telecentric feature and intermediate image forming ability constitute one of the essential features of lens system according to the present invention.

Japanese Patent Publication No. 30787/1970 has disclosed a projection lens system which forms a composite image from many partial images through lens systems disposed in arrays and which also has a telecentric arrangement. However, this projection lens system is of ordinary type and the length of the lens measured along the optical axis is not longer than the effective diameter thereof, which is entirely different from that of the present invention.

SUMMARY OF THE INVENTION

In accordance with the present invention there is provided an improved projection apparatus suitably used in copying apparatus, which comprises a plural number of projection optical systems each of which is composed of a first lens and a second lens. Between the first and second lenses there is formed an intermediate image of a portion of an original. The length of each the lens measured along the optical axis is larger (for example, by 2 to 60 times) than its effective lens diameter (for example, 1 to 2 mm). Another feature is that the first lens is designed as an exit side telecentric lens whereas the second lens is an incident side telecentric lens. These structural features make is possible to produce a projection apparatus most suitably adaptable to a copying machine.

Other and further objects, features and advantages of the present invention will appear more fully from the following description taken in connection with the accompanying drawing.

BRIEF DESCRIPTION OF THE DRAWINGS

FIGS. 1 through 4 are explanatory views of a projection apparatus used in a copying apparatus according to the prior art;

DESCRIPTION OF THE PREFERRED EMBODIMENTS

Figure 5:
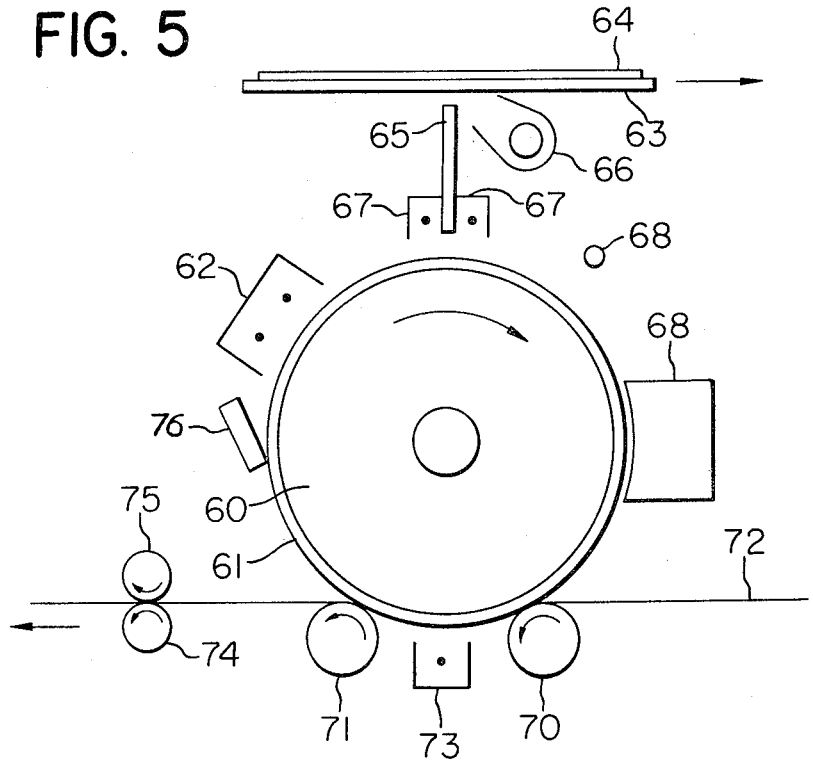
FIGS. 5 and 6 show a projection apparatus according to the invention.

Referring first to FIG. 1, there is shown a copying machine to which the projection apparatus disclosed in the aforementioned U.S. patent is applied. The copying machine generally designated by 1 comprises a transparent platen 2, a supporting plate 3 stationarily disposed for a photosensitive plate P, a movable carriage 4 for carrying an optical projection system generally designated by 5 and a driving system including a reversible constant speed electric motor 6 and a gear box 7.

An original document D is laid face down on the platen 2. The photosensitive plate P is supported by the stationary support 3 with its photosensitive material layer up. The driving system drives the carriage 4 moving across the original surface and the photosensitive surface P.

The carriage 4 is mounted on a driving screw shaft 10 at one side and on a bearing shaft 11 at another side. The screw shaft 10 and the bearing shaft 11 are disposed on either side of the supporting plate 3 in a spaced parallel relation. The gear box 7 is in connection with the driving screw shaft so as to rotate the latter to cause movement of the scanning system 5 in either direction. The driving system must be so made as to drive the optical projection system 5 at a uniform motion in either direction and to reverse the moving direction thereof when the system reaches the end of its travel in either direction.

The projection system 5 is composed of an elongated housing 13 one end of which is supported by a block 14 screwed on the driving screw shaft 10 and the other end is supported by a block 15 slide movably mounted on the bearing shaft 11. These blocks 14 and 15 constitute a part of the carriage 4 which is to be moved together with the blocks. Extending between the blocks 14 and 15 and fitted to them there are a pair of fluorescent lamps L, L received by suitable sockets and power-supplied by a suitable power source (not shown). The lamps L, L are disposed in parallel with each other to illuminate the original document D.

Within the housing 13, there are three elongate lens strips 20, 21 and 22 extending along the length of the housing and disposed in overlapped relation between the surface of the original document D and the photosensitive surface P. The uppermost lens strip 20 is composed of a plural number of lens elements 24 set in arrays along the full length of the strip. As seen in FIG. 2 the lens strip 20 comprises two rows of lens elements 24. The two rows are in parallel with each other and the second row is shifted relative to the first row by a distance equal to half of the distance between two lens elements in the second row. The lens strip 20 is preferably made of plastics as a unitary molding including the lens elements and other necessary parts.

Other lens strips 21 and 22 are entirely the same as the above described lens strip 20 in structure and disposed relative to strip 20 in such manner that each lens element in one strip and each element in another one are coaxial and one single projection apparatus is formed as a whole. The single projection apparatus generally designated by 25 is illustrated in FIG. 3 including a lens element 24 of the strip 20, a lens element 26 of the strip 21 and a lens element 27 of the strip 22, which elements 24, 26 and 27 are aligned coaxially. In the drawing the reference numeral 31 designates a stop and 32 is a field stop. As will be easily understood, 31 is one representative of a plurality of stops and also 32 is one representative of a plurality of field stops existing in the projection system 5. The lens elements 24, 26 and 27 together with the stops 31 and 32 constitute one optical projection apparatus 25. A plurality of such optical projection units 25 constitute the projection system 5. As the projection system 5 moves from the one side of the original document D to another side, the whole original surface is scanned while each element area of original D in the focal plane of lens element 24 of each projection unit 25 being successively scanned one by one and an image of the scanned element area being projected upon the photosensitive surface P which lies in the focal point of the lens element 27.

To assure a complete scanning by all of the units 25, the projection system 5 contains a plate 30 having therein a plurality of openings 31 aligned respectively with the lens elements 24 of the strip 20. As seen from FIG. 3, each opening 31 functions as an aperture stop for the corresponding one of lens elements 24 to control the amount of light coming into each unit 25. Each field stop 32 serves to control the coverage of the object area so that the size of the element area scanned by any one of the projection units 25 at any one time point is defined by it. In each projection unit, the lens element 24 functions as an objective lens with respect to the projection unit and as shown in FIG. 4 it is adapted to focus the element area of original D upon the field lens 26. By way of example, a letter "P" is shown in FIG. 4, an image of which is formed in the focal plane of the lens 24 coincident with the plane of the lens 26, as indicated by light ray locus T. Here it should be noted that the letter P is once reversed and then it is reformed to its original form.

The lens element 27 forms on the photosensitive surface P an image of the letter P now existing in the field lens 26. The letter P appearing on the photosensitive surface P in FIG. 4 is in a reversed (mirror image) relation to the original letter P in the document D. Each projection unit in the system 5 is adapted to reproduce the element area of an object plane such as document D and to form a corresponding reversed image on the projection plane. A composite of a plurality of element images thus formed gives a complete photographic indication of information present in the document D. When the projection plane P is actually in a form of a reusable electrostatic copying plate such as photoconductive plate or drum, the latent image on the plate or drum is formed as a reversed image which will, when developed with toner and transferred, give a normally readable image on the transfer sheet of paper.

Figure 6:
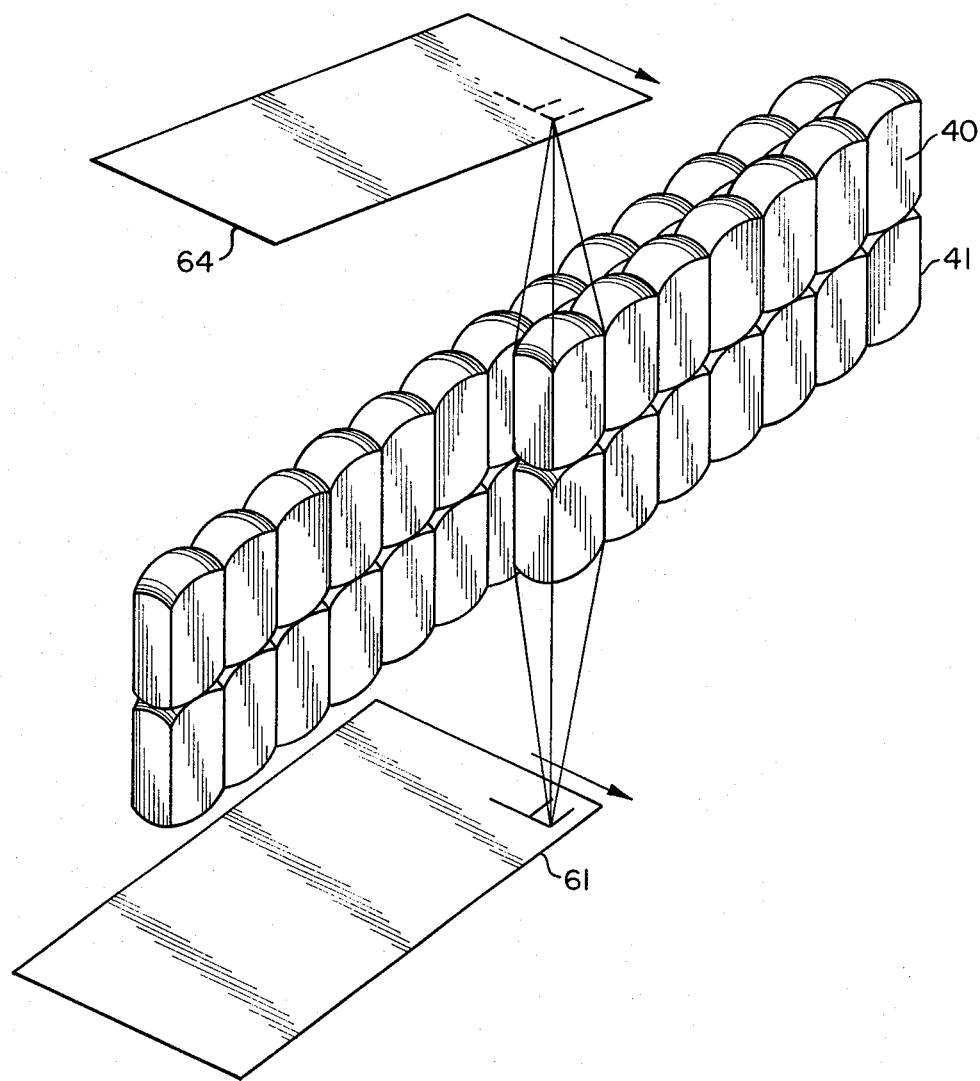

Referring now to FIGS. 5 and 6 there is shown one embodiment of the improved projection apparatus according to the invention. The reference numeral 60 designates a drum having thereon a photosensitive medium 61 composed of an electrically conductive layer, a photoconductive layer and a transparent top insulating layer laminated one on another in this order. The drum 60 is driven to rotate in the direction of the arrow by a motor not shown. At first, the photosensitive medium 61 is subjected to charging by a corona discharger 62 which charges the surface uniformly. The polarity of charge applied to the photosensitive medium at this step is positive when the photoconductive layer is of an N-type semiconductor and the polarity is negative when it is of P-type semiconductor. Thereafter, the photosensitive medium 61 is subjected to an image-wise exposure of an original 64 laid on the transparent original table 63. The original table is moved in the direction of the arrow in synchronism with the rotation of the drum 60 at a speed which is equal to the pheripheral speed of drum 60 times the reciprocal of the image formation magnification. Therefore, in case of unity magnification, the moving speed of the original table 63 is equal to the peripheral speed of the drum 60. The image of the original is formed on the photosensitive medium 61 through a lens array 65. The area of the original 64 opposed to the lens array, that is, the area an image of which is to be formed on the photosensitive medium 61, is illuminated by an illumination system 66 comprising a lamp and a reflector. By adjusting the illumination light value in this illumination system 66, the exposure value to the photosensitive medium 61 can be adjusted.

Simultaneously with the image-wise exposure through the lens array 65, the photosensitive medium 61 is subjected to a charge removing action by a corona discharger 67 the polarity of which is opposite to that of AC corona discharger 62. As a result, there is formed on the medium 61 a charge pattern corresponding to the light image of original 64. Then, the photosensitive medium is further subjected to a whole surface exposure so that an electrostatic latent image of high contrast is produced thereon. The latent image thus formed is developed with a developing device 69, which may be of cascade type or magnetic brush type, and is thereby visualized as a toner image. The toner image is transferred onto a transfer sheet 72. The transfer sheet is fed from a feeding means not shown and brought into contact with the photosensitive medium 61 by rollers 70, 71 so that it is transported at the same speed as that of the photosensitive medium 61 to receive the toner image. In order to increase the transferring efficiency, at the transferring station there is applied onto the backside surface of the transfer sheet 72 an electric charge the polarity of which is opposite to that of the tone used in developing. For this purpose, a corona discharger 73 is provided at the transferring station. The toner image transferred onto the transfer sheet 72 is fixed by means of a suitable fixing device such as a heat fixing device provided with a pair of rollers 74, 75 in press-contact with the transfer sheet. After fixing, the transfer sheet carrying thereon the fixed toner image is delivered to a sheet receiving means, not shown.

After transferring, the surface of the photosensitive medium is cleaned up with an elastic cleaning blade 76 the edge of which removes any remaining toner from the surface of the medium. Now, the cleaned photosensitive medium is ready for the next cycle of the above described image processing.

While the corona discharger 67 is disposed to remove charge from the surface of the photosensitive medium 61 simultaneously with an image-wise exposure, it may be disposed between the charger 62 and the image forming system so as to remove charge from the surface of the medium 61 prior to an image-wise exposure. For this modification, the lamp 68 becomes unnecessary. Also, the photosensitive medium 61 may be such that it has no insulating surface layer. In this case, the discharger 67 and the lamp 68 become unnecessary.

Now, a detailed explanation of the projection lens array 65 shown in FIG. 5 will be made referring to FIG. 6.

A first lens 40 and a second lens 41 arranged coaxially constitute a lens system. Like the case of FIG. 2, a plurality of such lens systems are disposed in two rows. These lens systems also may be disposed in three or more rows.

Figure 7:
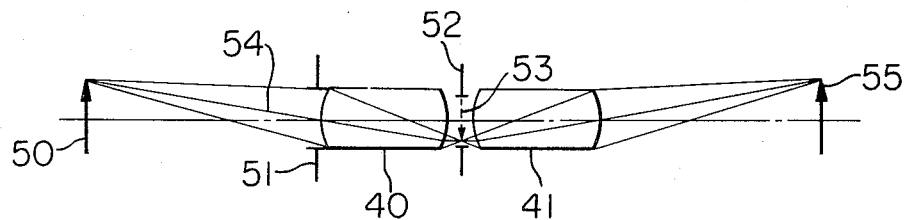
FIG. 7 particularly shows one lens system from the arrays of lens systems shown in FIG. 6.

The functions of the lenses 40 and 41 are seen in FIG. 7. In FIG. 7, the reference numeral 50 designates a portion of an object, that is, an original. 51 is an aperture stop positioned in the entrance pupil of the lens 40. The reference numeral 52 designates a field stop disposed in a plane on which an intermediate image 53 of the object 50 is formed through the first lens 40. This field stop serves to define the coverage of the object plane. It is preferable to space the field stop 52 from the image space surface of the lens 40 as well as from the object space surface of the lens 41 as far as possible to prevent any image of dust adhered on these surfaces from being formed on the projection plane. The intermediate image is preferably a minified image so as to allow the interposition of the field stop 52. The reference numeral 54 indicates a principal ray. As mentioned above, the first lens 40 is a lens telecentric at the image space side and the second lens 41 is telecentric at the object space side. Therefore, the principal ray incident upon and exiting from the lenses 40, 41 is parallel with the principal optical axis. This means that no loss of the light is caused by the lens 41 and the light used in forming the intermediate image is used efficiently to reform its image on the projection plane. In other words, owing to the lenses 40, 41 being telecentric, the image space side surface of the lens 40 and the object space side surface of the lens 41 serve as if they form an air lens and therefore they can function also as a field lens 26 as shown in FIG. 4. In this manner, according to this embodiment of the invention, the number of lenses required for forming a projection lens system can be reduced without any loss of brightness of the image projected.

In our experiments relating to the present invention, it has been found that a good result is obtainable by using those lenses 40 and 41 which are identical to each other (but plane symmetric relative to the intermediate image 53) and the lens thickness of which along the optical axis is 2 to 60 times larger than the effective lens diameter thereof.

As described hereinafter, the lenses 40, 41 are preferably so designed as to satisfy the formulae (6)–(10) as to the first lens 40 and the formulae (16)–(20) as to the second lens 41 respectively.

Now, referring to FIG. 8 in which various symbols and characters are given for the sake of explanation, the design of lens 40 will be described.

Figure 8:
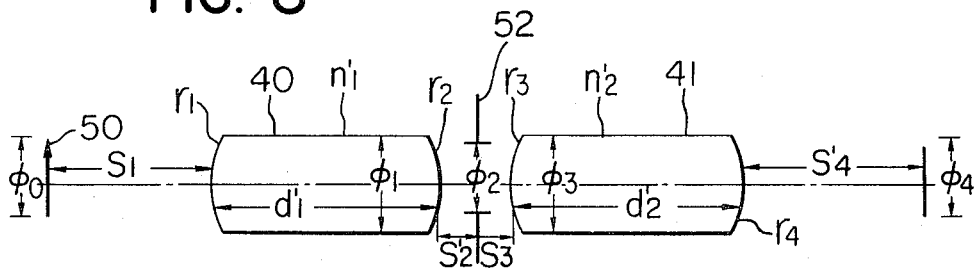
FIG. 8 is a similar view to FIG. 7 but shows the lens system together with various symbols and characters given thereto for the purpose of explanation.

In FIG. 8, $r_1$ is the radius of curvature of the first surface, that is, the object space side surface of the first lens 40 and $r_2$ is the radius of curvature of the second surface, that is, the image space side surface of the same (in case of the lens shown in FIG. 8, $r_2$ is a negative value). $d'_1$ is the center thickness of the first lens, that is, the lens thickness from the first surface to the second surface measured along its optical axis. $n'_1$ is the principal refractive index, that is, the refractive index for representative design wave length of the material of the lens 40. Also, the effective diameter of the lens is represented by $\Phi_1$ and the size of object 50 by $\Phi_0$. The symbol $\Phi_2$ indicates the size of intermediate image 53 formed by the lens 40. $S_1$ is the distance from the first surface of the lens 40 to the object 50 (in the shown case, $S_1$ is a negative value), and $S'_2$ is the distance from the second surface of the first lens 40 to the intermediate image 53. $\beta_1(\equiv -|\Phi_2/\Phi_0|)$ is the lateral magnification of intermediate image 53 relative to the object 50. The effective F number of the lens 40 at the object space is represented by Fe.

The effective F number, Fe is a known value determined depending upon the condition of illumination by the following formula:

$$Fe \equiv \frac{\sqrt{S_1 + \left(\frac{\Phi_1}{2}\right)^2}}{\Phi_1} \tag{1}$$

Also, the lateral magnification of the intermediate image, $\beta_1(|\beta_1|<1)$ which should be determined as not to cause any kick-out of partial image, the object distance $S_1$ and the lens back to the intermediate image, that is, $S'_2$ are all known values which can be determined beforehand. The principal refractive index $n'_1$ is also determined by selection of material and therefore it is a know value. From these five known values Fe, $\beta_1$, $S_1$, $S'_2$ and $n'_1$ and using the theory of ideal image forming system, there are determined the following conditions for $r_1$ (radius of curvature of the first surface of the lens 40), $r_2$ (radius of curvature of the second surface), $d'_1$ (center thickness), $\Phi_1$ (effective lens diameter) and $\Phi_0$ (effective partial diameter of object):

Firstly, the relation of the lateral magnification $\beta_1$ and lens construction data is given by $$\beta_1 = \frac{1}{\{\phi_1 + \phi_2 - \phi_1 e'_1 \phi_2\} S_1 + \{1 - e'_1 \phi_2\}} \quad (2)$$

wherein, $\phi_2 \equiv (n'_1 - 1)/r_1$ (refractive power of the first surface)
$\phi_2 \equiv (1 - n'_1)/r_2$ (refractive power of the second surface)

and $e'_1 \equiv d'_1/n'_1$

Secondly, from the condition that the principal ray of the beam coming from the object and passing through the center of the first surface should travel in parallel with the optical axis after exiting from the second surface, which is equivalent to the condition that the focal length of the second surface (that is $1/\phi_2$) should be equal to $e'_1$, there is given the following relation;

$$1/\phi_2 = e'_1 \quad (3)$$

Thirdly, from the condition that the light beam incident upon the lens 40 from the edge of the effective object diameter $\Phi_0$ should not be kicked out (see FIG. 7), namely from the condition that after passing the first surface, the lowermost ray of the beam of light should travel along the edge of the lens 40 being parallel with the beam, there is given the following relation:

$$\phi_1 = -(1/S_1)\{1 + (\Phi_0/\Phi_1)\} \quad (4)$$

Lastly, from the condition that the distance $S'_2$ from the second surface of the lens 40 to the intermediate image should be kept at an appropriate value preliminarily, there is given $$S'_2 = \beta_1 \times \{(1 - \phi_1 e'_1)S_1 - e'_1\} \quad (5)$$

Setting a simultaneous equation of the above described conditions (1)–(5) and mathematically solving it with respect to $r_1$, $r'_2$, $d'_1$, $\Phi_1$ and $\Phi_0$ gives $$r_1 = (n'_1 - 1) \times \frac{\beta_1 S_1}{\left[(1 - \beta_1) - \frac{S'_2}{\beta_1 S_1}\right]} \quad (6)$$

$$r_2 = (1 - n'_1) \times \beta_1 S_1 \quad (7)$$

$$d'_1 = n'_1 \times \beta_1 S_1 \quad (8)$$

$$\Phi_1 = \frac{-S_1/Fe}{\sqrt{1 - \left(\frac{1}{2Fe}\right)^2}} \quad (9)$$

and $$\Phi_0 = \left[\frac{\left(\frac{S'_2}{\beta_1}\right) - S_1}{\beta_1 S_1}\right] \times \Phi_1 \quad (10)$$

Also, the conditions of the second lens 41 will be described with reference of the same figure, FIG. 8 in which:

$r_3$ is the radius of curvature of the first surface of the second lens 41 and $r_4$ is the radius of curvature of the second surface of the same (in the shown case, $r_4$ is a negative value). $d'_2$ is the center thickness of the second lens 41 and $n'_2$ is the principal refractive index of the material of the same. $\Phi_3$ is the effective lens diameter and $\Phi_4$ is the size of projected image on the projection plane for the second lens. $S_3$ is the distance from the first surface of the second lens to the intermediate image 53 (in the shown case, $S_3$ is a negative value) and $S'_4$ is the distance from the second surface of the second lens to the projected image. The lateral magnification of the projected image 55 relative to the intermediate image 53 is represented by $\beta_2(\equiv -|\Phi_4/\Phi_2|)$. The effective F number of this second lens 41 at image space is represented by Fe'.

The effective F number is determined depending on the condition of brightness of the projected image and becomes known from the formula:

$$Fe' = \frac{\sqrt{(S'_4)^2 + \left(\frac{\Phi_3}{2}\right)^2}}{\Phi_3} \quad (11)$$

Also, like those regarding the first lens, the lateral magnification $\beta_2(|\beta_2|>1)$, the distance of the intermediate image $S_3$ and the lens back to the projection plane $S'_4$ can be predetermined and therefore known values. The principal refractive index of material $n'_2$ also becomes known at the time of selection of material.

From these five known values, Fe', $\beta_2$, $S_3$, $S'_4$ and $n'_2$ and in accordance with the theory of ideal image forming system, the following conditions are given to determine the values of the radius of curvature of the first surface: $r_3$, the radius of curvature of the second surface: $r_4$, the center thickness of the second lens: $d'_2$, the effective lens diameter: $\Phi_3$ and the effective partial diameter of projected image: $\Phi_4$:

Firstly, the relation between the lateral magnification $\beta_2$ and the construction data of the lens 41 is given by $$\left(\frac{1}{\beta_2}\right) = \frac{1}{\{\phi_2 + \phi_4 - \phi_3 e'_2 \phi_4\}(-S'_4) + \{1 - e'_2 \phi_3\}} \quad (12)$$

wherein

-continued $$\begin{cases} \phi_3 = \dfrac{n'_2 - 1}{r_3} \text{ (refractive power of the first surface)} \\ \phi_4 = \dfrac{1 - n'_2}{r_4} \text{ (refractive power of the second surface)} \\ e'_2 = \dfrac{d'_2}{n'_2} \end{cases}$$

In order to make the incident beam including a principal ray running in parallel with the optical axis passed through the second lens, neither too large nor too small with respect to the effective diameter $\Phi_3$ thereof, it is desirable that there be an exit pupil on the second surface of the second lens. This requirement is equivalent to the condition that the focal length of the first surface (that is $1/\phi_3$) be just equal to $e'_2$. From this condition there is given the following relation:

$$1/\phi_3 = e'_2 \tag{13}$$

Thirdly, from the condition that the light beam coming from the edge of the effective diameter of intermediate image $\Phi_2$ and incident upon the second lens 41 should not be kicked out (see FIG. 7), namely from the condition that the lowermost ray of the beam should travel, after passing through the first surface, along the edge of the lens 41 extending in parallel with the beam, there is obtained the following relative formula:

$$\phi_4 = \dfrac{1}{S'_4}\left(1 + \dfrac{\Phi_4}{\Phi_3}\right) \tag{14}$$

Lastly, from the condition that the distance $S_3$ from the first surface of the second lens 41 to the intermediate image should be kept at an appropriate value beforehand there is given the following relative formula:

$$S_3 = 1/\beta_2 \times \{(1 - \phi_4 e'_2)S'_4 + e'_2\} \tag{15}$$

Solving the above formulae of condition (11)–(15) simultaneously with respect to $r_3$, $r_4$, $d'_2$, $\Phi_3$ and $\Phi_4$ gives:

$$r_3 = (1 - n'_2) \times \dfrac{S'_4}{\beta_2} \tag{16}$$

$$r_4 = (n'_2 - 1) \times \dfrac{S'_4/\beta_2}{\left[\left(1 - \dfrac{1}{\beta_2}\right) - \dfrac{S_3 \times \beta_2}{S'_4}\right]} \tag{17}$$

$$d'_2 = -n'_2 \times S'_4/\beta_2 \tag{18}$$

$$\Phi_3 = \dfrac{S'_4/Fe'}{\sqrt{1 - \left(\dfrac{1}{2Fe'}\right)^2}} \tag{19}$$

and $$\Phi_4 = \left[\dfrac{S_3\beta_2 - S'_4}{S'_4/\beta_2}\right] \times \Phi_3 \tag{20}$$

Thus, in the combined coaxial optical system of the first lens 40 and the second lens 41 there is formed firstly an intermediate image (image dia.: $\Phi_2$) of an object to be projected (object dia.: $\Phi_0$) by the first lens and secondly the intermediate image is relayed onto the projection plane by the second lens as an erect image of $\Phi_4$ in projected image diameter, without any loss of uniformity of brightness. Here, note should be directed to the fact that in general $\beta_1 \times \beta_2 = +1$, namely the use of erect unit magnification is necessary to form a whole composite image of the object without any conflict on the projection plane using an arrangement of a plurality of such coaxial optical systems each comprising the first and second lenses. This means that the arrangement of the first and second lenses should be made as to satisfy the following relation:

$$\beta_2 = 1/\beta_1 \tag{21}$$

Selfevidently, the above condition necessarily leads to $$Fe' = Fe \tag{22}$$

Therefore, for such coaxial optical system of erect unit magnification in which the first lens 40 and the second lens 41 are united together, it is concluded that if $\beta_1$ and Fe of the first lens 40 are determined by proper conditions, then the values of $\beta_2$ and Fe' of the second lens can be determined automatically in accordance with the above formulae (21) and (22). However, it should be noted that other values $S_1$, $S'_2$ and $n'_1$ set for the first lens and $S_3$, $S'_4$ and $n'_2$ for the second lens may be determined independently of each other under proper conditions.

Generally, if the first and second lenses are different from each other in construction, then it necessitates the manufacture of two different lenses. From the manufacturing point of view, this should be avoided if possible. To satisfy this desire it is considered that as the second lens satisfying the conditions (21) and (22), also a first lens is used and two first lenses are disposed symmetically with respect to the intermediate image plane so as to form an aforementioned coaxial optical system. According to this conception, it is allowed to use the above defined first lens also as the necessary second lens. In this case, the relation between the elements for construction of the first lens and those of the second lens is given by:

$r_3 = -r_2$, $r_4 = -r_1$, $d'_2 = d'_1$, $n'_2 = n'_1$, $\Phi_3 = \Phi_1$, $\Phi_4 = \Phi_0$, $\beta_2 = 1/\beta_1$, $S_3 = -S'_2$, $S'_4 = -S_1$ and $Fe' = Fe$.

In the following table 1, there are shown various values of design for Embodiments 1 through 10 of the invention in which the first lens and the second lens are disposed symmetrically relative to the intermediate image plane.

TABLE 1

| Embodiment No. | $\Phi_0, \Phi_4$ | $\Phi_1, \Phi_3$ | $S'_2, -S_3$ | $S_1, -S'_4$ | $\beta_1, \dfrac{1}{\beta_2}$ | $n'_1, n'_2$ | Material | $r_1$ | $r_2$ | $r_3$ | $r_4$ | $d'_1, d'_2$ |
|---|---|---|---|---|---|---|---|---|---|---|---|---|
| 1 | 3 | 2 | 1 | −20 | −0.612 | 1.491 | Acrylic | 3.93 | −6.01 | 6.01 | −3.93 | 18.25 |
| 2 | 3 | 2 | 1 | −20 | −0.612 | 1.590 | Styrene | 4.72 | −7.22 | 7.22 | −4.72 | 19.46 |
| 3 | 3 | 2 | 1 | −20 | −0.612 | 1.586 | Lexan | 4.69 | −7.17 | 7.17 | −4.69 | 19.41 |

TABLE 1-continued

| Embodiment No. | $\Phi_0, \Phi_4$ | $\Phi_1, \Phi_3$ | $S'_2, -S_3$ | $S_1, -S'_4$ | $\beta_1, \frac{1}{\beta_2}$ | $n'_1, n'_2$ | Material | $r_1$ | $r_2$ | $r_3$ | $r_4$ | $d'_1, d'_2$ |
|---|---|---|---|---|---|---|---|---|---|---|---|---|
| 4 | 3 | 2 | 1 | −20 | −0.612 | 1.571 | SAN | 4.57 | −6.99 | 6.99 | −4.57 | 19.23 |
| 5 | 3 | 2 | 1 | −20 | −0.612 | 1.562 | NAS | 4.50 | −6.88 | 6.88 | −4.50 | 19.12 |
| 6 | 3 | 2 | 1 | −20 | −0.612 | 1.466 | TPX | 3.73 | −5.70 | 5.70 | −3.73 | 17.94 |
| 7 | 3 | 2 | 1 | −20 | −0.612 | 1.51633 | BK7 | 4.13 | −6.32 | 6.32 | −4.13 | 18.56 |
| 8 | 3 | 2 | 1 | −20 | −0.612 | 1.72916 | LAK18 | 5.83 | −8.92 | 8.92 | −5.83 | 21.16 |
| 9 | 3 | 2 | 1 | −20 | −0.612 | 1.80518 | SF6 | 6.44 | −9.86 | 9.86 | −6.44 | 22.10 |
| 10 | 2 | 1 | 1 | −15.05 | −0.42 | 1.51633 | BK7 | 2.58 | −3.2 | 3.2 | −2.58 | 9.5 |

Remark: unit of each value is mm, except for refractive indica $n'_1$ and $n'_2$.

Furthermore, in our experiments concerning the invention, it has been found that the first and second lenses may have a tolerance of some ±10% in designing the lenses in accordance with the above described conditional formulae (6)–(10) and (16)–(20). Namely, $r_1$, $r_2$, $d'_1$, $\Phi_1$ and $\Phi_2$, and $r_3$, $r_4$, $d'_2$, $\Phi_3$ and $\Phi_4$ are allowed to be:

$$K_1 \times (n'_1 - 1) \times \frac{\beta_1 S_1}{\left[(1-\beta_1) - \frac{S'_2}{\beta_1 S_1}\right]} \leq r_1 \leq K_2 \times$$

$$(n'_1 - 1) \times \frac{\beta_1 S_1}{\left[(1-\beta_1) - \frac{S'_2}{\beta_1 S_1}\right]}$$

$$K_1 \times (1-n'_1) \times \beta_1 S_1 \geq r_2 \geq K_2 \times (1-n'_1) \times \beta_1 S_1$$

$$K_1 \times n'_1 \times \beta_1 S_1 \leq d'_1 \leq K_2 \times n'_1 \times \beta_1 S_1$$

$$K_1 \times \frac{-S_1/Fe}{\sqrt{1-\left(\frac{1}{2Fe}\right)^2}} \leq \Phi_1 \leq K_2 \times \frac{-S_1/Fe}{\sqrt{1-\left(\frac{1}{2Fe}\right)^2}}$$

$$K_1 \times \left[\frac{\left(\frac{S'_2}{\beta_1}\right) - S_1}{\beta_1 S_1}\right] \times$$

$$\Phi_1 \leq \Phi_0 \leq K_2 \times \left[\frac{\left(\frac{S'_2}{\beta_1}\right) - S_1}{\beta_1 S_1}\right] \times \Phi_1$$

$$(1 - n'_2) \times \frac{S'_4}{\beta_2} \times K_1 \leq r_3 \leq K_2 \times (1 - n'_2) \times \frac{S'_4}{\beta_2}$$

$$K_1 \times (n'_2 - 1) \times \frac{S'_4/\beta_2}{\left(1 - \frac{1}{\beta_2}\right) - \frac{S_3 \times \beta_2}{S'_4}} \geq r_4 \geq K_2 \times$$

$$(n'_2 - 1) \times \frac{S'_4/\beta_2}{\left[\left(1 - \frac{1}{\beta_2}\right) - \frac{S_3 \times \beta_2}{S'_4}\right]} - n'_2 \times S'_4/\beta_2 \times$$

$$K_1 \leq d'_2 \leq K_2 \times (-n'_2) \times S'_4/\beta_2$$

$$\frac{S'_4/Fe'}{\sqrt{1-\left(\frac{1}{2Fe'}\right)^2}} \times K_1 \leq \Phi_3 \leq \frac{S'_4/Fe'}{\sqrt{1-\left(\frac{1}{2Fe'}\right)^2}} \times K_2$$

$$\left[\frac{S_3\beta_2 - S'_4}{S'_4/\beta_2}\right] \times$$

$$\Phi_3 \times K_1 \leq \Phi_4 \leq \left[\frac{S_3\beta_2 - S'_4}{S'_4/\beta_2}\right] \times \Phi_3 \times K_2$$

TABLE 2

| Embodiment No. | $\Phi_1, \Phi_4$ | $\Phi_1, \Phi_3$ | $S'_2, -S_3$ | $S_1, -S'_4$ | $\beta_1, \frac{1}{\beta_2}$ | $n'_1, n'_2$ | Material | $r_1$ | $r_2$ | $r_3$ | $r_4$ | $d'_1, d'_2$ |
|---|---|---|---|---|---|---|---|---|---|---|---|---|
| 11 | 2.0 | 1.7 | 1.5 | −16.97 | −0.455 | 1.51633 | BK7 | 3.242 | −4.278 | 4.278 | −3.242 | 11.71 |
| 12 | 2.7 | 1.7 | 1.8 | −17. | −0.479 | 1.491 | Acryl | 3.175 | −4. | 4. | −3.175 | 12.1 |

Remark: unit is the same as in Table 1.

What we claim is:

1. A projection apparatus for projecting an image of an original from an object plane to a plane of projection comprising:
   a plurality of projection optical systems disposed between the object plane and the plane of projection and along a predetermined direction, wherein said two planes are at least partially opposed and are fixed relative to each other, and wherein each projection optical system comprises a first and a second lens arranged coaxially with the optical axis of said optical system so that the first lens forms an intermediate image of a portion of said object plane between the first and second lenses and said second lens reforms said intermediate image on a portion of said projection plane, the length of each lens measured along the optical axis being larger than the effective diameter thereof, wherein the first lens is an exit side telecentric lens and the second lens is an incident side telecentric lens;
   a driving apparatus for producing a relative movement between said projection optical system and said object and projection planes;
   a member for supporting the original on said object plane; and
   a member for supporting a photosensitive member on said projection plane.

2. A projection apparatus as claimed in claim 1, wherein the thickness of each lens measured along the optical axis is 2 to 60 times larger than the effective diameter thereof.

3. A projection apparatus including a projection optical system for forming on a plane of projection a mirror image of an object lying on an object plane, characterized in that said projection optical system comprises a first and a second lens arranged coaxially so that the first lens forms an intermediate image between said first and second lenses, and the second lens reforms said intermediate image on the projection plane, in that the construction data and effective diameter of said first lens are given by:

$$r_1 = (n'_1 - 1) \times \frac{\beta_1 S_1}{\left[(1 - \beta_1) - \frac{S'_2}{\beta_1 S_1}\right]}$$

$$r_2 = (1 - n'_1) \times \beta_1 S_1$$

$$d'_1 = n'_1 \times \beta_1 S_1$$

$$\Phi_1 = \frac{-S_1/Fe}{\sqrt{1 - \left(\frac{1}{2Fe}\right)^2}}$$

$$\Phi_0 = \left[\frac{\left(\frac{S'_2}{\beta_1}\right) - S_1}{\beta_1 S_1}\right] \times \Phi_1$$

where,
$r_1$ is the radius of curvature of the object space side surface of the first lens,
$r_2$ is the radius of curvature of the image space side surface of the first lens,
$d'_1$ is the lens thickness of the first lens along the optical axis between said object space side surface and said image space side surface,
$\Phi_1$ is the effective diameter of the first lens,
$\Phi_0$ is the size of object,
$n'_1$ is refractive index of medium of the first lens to its design wave length,
$\beta_1$ is the lateral magnification of the first lens,
$S_1$ is the distance from the object space side surface of the first lens to the object plane along the optical axis, $S'_2$ is the distance from the image space side surface to the intermediate image plane along the optical axis and
Fe is the effective F number at the object space side; and
in that the construction data and effective diameter of the second lens are given by:

$$r_3 = (1 - n'_2) \times \frac{S'_4}{\beta_2}$$

$$r_4 = (n'_2 - 1) \times \frac{S'_4/\beta_2}{\left[\left(1 - \frac{1}{\beta_2}\right) - \frac{S_3 \times \beta_2}{S'_4}\right]}$$

$$d'_2 = -n'_2 \times S'_4/\beta_2$$

$$\Phi_3 = \frac{S'_4/Fe'}{\sqrt{1 - \left(\frac{1}{2Fe'}\right)^2}}$$

-continued $$\Phi_4 = \left[\frac{S_3 \beta_2 - S'_4}{S'_4/\beta_2}\right] \times \Phi_3$$

wherein,
$r_3$ is the radius of curvature of the object space side surface of the second lens,
$r_4$ is the radius of curvature of the image space side surface of the second lens,
$d'_2$ is the lens thickness of the second lens between the object space side surface and the image space side surface along the optical axis,
$\Phi_3$ is the effective diameter of the second lens,
$\Phi_4$ is the size of the image projected on the projected plane by the second lens,
$n'_2$ is the refractive index of medium of the second lens to its design wave length,
$\beta_2$ is the lateral magnification of the second lens,
$S_3$ is the distance from the object space side surface of the second lens to the intermediate image plane along the optical axis,
$S'_4$ is the distance from the image space side surface of the second lens to the projected image along the optical axis and
Fe' is the effective F number of the image space side surface of the second lens.

4. A projection apparatus as claimed in claim 3, wherein
$r_3 = -r_2$
$r_4 = -r_1$
$d'_2 = d'_1$
$n'_2 = n'_1$
$\Phi_3 = \Phi_1$
$\Phi_4 = \Phi_0$
$\beta_2 = 1/\beta_1$
$S_3 = -S'_2$
$S'_4 = -S_1$ and
Fe' = Fe.

5. A projection apparatus including a projection optical system for forming on a plane of projection a mirror image of an object lying on an object plane, characterized in that said projection optical system comprises a first and a second lens arranged coaxially so that said first lens forms an intermediate image between said first and second lenses, and the second lens reforms said intermediate image on the projection plane, and that the construction data and the effective diameter of the first lens are given by:

$$K_1 \times (n'_1 - 1) \times \frac{\beta_1 S_1}{\left[(1 - \beta_1) - \frac{S'_2}{\beta_1 S_1}\right]} \leq r_1 \leq K_2 \times$$

$$(n'_1 - 1) \times \frac{\beta_1 S_1}{\left[(1 - \beta_1) - \frac{S'_2}{\beta_1 S_1}\right]}$$

$K_1 \times (1 - n'_1) \times \beta_1 S_1 \leq r_2 \leq K_2 \times (1 - n'_1) \times \beta_1 S_1$ $K_1 \times n'_1 \times \beta_1 S_1 \leq d'_1 \leq K_2 \times n'_1 \times \beta_1 S_1$ $$K_1 \times \frac{-S_1/Fe}{\sqrt{1-\left(\frac{1}{2Fe}\right)^2}} \leq \Phi_1 \leq K_2 \times \frac{-S_1/Fe}{\sqrt{1-\left(\frac{1}{2Fe}\right)^2}}$$

$$K_1 \times \left[\frac{\left(\frac{S'_2}{\beta_1}\right)-S_1}{\beta_1 S_1}\right] \times$$

$$\Phi_1 \leq \Phi_0 \leq K_2 \times \left[\frac{\left(\frac{S'_2}{\beta_1}\right)-S_1}{\beta_1 S_1}\right] \times \Phi_1$$

wherein, $r_1$ is the radius of curvature of the object space side surface of the first lens, $r_2$ is the radius of curvature of the image space side surface of the first lens, $d'_1$ is the lens thickness of the first lens between the object space side surface and the image space side surface along the optical axis, $\Phi_1$ is the effective diameter of the first lens, $\Phi_0$ is the size of the object, $n'_1$ is the refractive index of medium of the first lens to its design wave length, $\beta_1$ is the lateral magnification of the first lens, $S_1$ is the distance from the object space side surface of the first lens to the object plane along the optical axis, $S'_2$ is the distance from the image space side surface of the first lens to the intermediate image plane along the optical axis, Fe is the effective F number of the object space side surface of the first lens, $K_1 = 0.9$ and $K_2 = 1.1$, and the construction data of effective diameter of the second lens are given by:

$$(1-n'_2) \times \frac{S'_4}{\beta_2} \times K_1 \leq r_3 \leq K_2 \times (1-n'_2) \times \frac{S'_4}{\beta_2}$$

$$K_1 \times (n'_2-1) \times \frac{S'_4/\beta_2}{\left[\left(1-\frac{1}{\beta_2}\right)-\frac{S_3 \times \beta_2}{S'_4}\right]} \geq r_4 \geq K_2 \times$$

$$(n'_2-1) \times \frac{S'_4/\beta_2}{\left[\left(1-\frac{1}{\beta_2}\right)-\frac{S_3 \times \beta_2}{S'_4}\right]} - n'_2 \times S'_4/\beta_2 \times$$

$$K_1 \leq d'_2 \leq K_2 \times (-n'_2) \times S'_4/\beta_2$$

$$\frac{S'_4/Fe'}{\sqrt{1-\left(\frac{1}{2Fe'}\right)^2}} \times K_1 \leq \Phi_3 \leq \frac{S'_4/Fe'}{\sqrt{1-\left(\frac{1}{2Fe'}\right)^2}} \times K_2$$

$$\left[\frac{S_3\beta_2 - S'_4}{S'_4/\beta_2}\right] \times$$

-continued $$\Phi_3 \times K_1 \leq \Phi_4 \leq \left[\frac{S_3\beta_2 - S'_4}{S'_4/\beta_2}\right] \times \Phi_3 \times K_2$$

wherein, $r_3$ is the radius of curvature of the object space side surface of the second lens, $r_4$ is the radius of curvature of the image space side surface of the second lens, $d'_2$ is the lens thickness of the second lens between the object space side surface and the image space side surface along the optical axis, $\Phi_3$ is the effective diameter of the second lens, $\Phi_4$ is the size of the image projected on the projection plane by the second lens, $n'_2$ is the refractive index of medium of the second lens to its design wave length, $\beta_2$ is the lateral magnification of the second lens, $S_3$ is the distance from the object space side surface of the second lens to the intermediate image plane along the optical axis, $S'_4$ is the distance from the image space side surface of the second lens to the projected image along the optical axis, Fe' is the effective F number of the image space side surface of the second lens, $K_1 = 0.9$ and $K_2 = 1.1$.

6. A projection apparatus as claimed in claim 5, wherein
$r_3 = -r_2$
$r_4 = -r_1$
$d'_2 = d'_1$
$n'_2 = n'_1$
$\Phi_3 = \Phi_1$
$\Phi_4 = \Phi_0$
$\beta_2 = 1/\beta_1$
$S_3 = -S'_2$
$S'_4 = -S_1$ and
$Fe' = Fe$.

7. A copying apparatus comprising:

an original table for supporting thereon an original to be copied;

an illumination apparatus for illuminating the original;

a photosensitive medium;

a projection lens array for forming an image of the original on the photosensitive medium, each of the projection lenses constituting said lens array comprising a first and a second lens arranged coaxially so that the first lens forms an intermediate image of a portion of the original between said first and second lenses and the second lens reforms said intermediate image on a portion of the photosensitive medium the length of each lens measured along the optical axis being larger than the effective diameter thereof, wherein the first lens is an exit side telecentric lens whereas the second lens is an incident side telecentric lens;

a charging device for electrically charging said photosensitive medium;

a developing device for providing a toner image by visualizing an electrostatic image formed by projecting a light image of the original on the charged photosensitive medium;

a transferring device for transferring said toner image onto a transfer material;

a fixing device for fixing said toner image transferred onto the transfer material and a driving apparatus for producing a relative movement between the projection lens array and the original table and photosensitive medium.

8. A projection apparatus for projecting an erect image of an object on a plane of projection comprising:

a plurality of projection optical systems disposed between the object plane and the plane of projection and along a predetermined direction, wherein said two planes are at least partially opposed and wherein each projection optical system comprises a first and a second bar lens arranged coaxially with the optical axis of said optical system so that the first lens forms an intermediate image of a portion of said object plane between the first and second lenses and said second lens reforms said intermediate image to form an erect image on a portion of said projection plane, each bar lens having a diameter substantially equal to the effective diameter thereof, a length, measured along the optical axis, larger than the effective diameter thereof, and lens surfaces at its opposite ends.

9. A projection apparatus as claimed in claim 8 wherein the first lens is an exit side telecentric lens whereas the second lens is an incident side telecentric lens.

10. A projection apparatus for projecting an erect image of an object on a plane of projection comprising:

a plurality of projection optical systems disposed between the object plane and the plane of projection and along a predetermined direction, wherein said two planes are at least partially opposed and wherein each projection optical system comprises a first and a second bar lens arranged coaxially with the optical axis of said optical system so that the first lens forms an intermediate image of a portion of said object plane between the first and second lenses and said second lens reforms said intermediate image to form an erect image on a portion of said projection plane, each bar lens having a diameter substantially equal to the effective diameter thereof, a length, measured along the optical axis, larger than the effective diameter thereof, and lens surfaces at its opposite ends; and a driving apparatus for producing a relative movement between said projection optical system and said object plane.

11. A projection apparatus as claimed in claim 10, wherein the first lens is an exit side telecentric lens whereas the second lens is an incident side telecentric lens.

12. An erect optical imaging system for copying apparatus forming optical paths for transmitting images from an object to an image surface comprising;

means for supporting an original object to be copied;

a first pair of array sets of object lenses having respective thicknesses along their optical axes greater than the radius of curvature of their surface on the object side, each array set offset from the other to provide an overlapping field of view with the other array set, and a second pair of array sets of relay lenses having at least the same thickness as the first pair and respectively juxtaposed relative to the first pair of array sets of object lenses to form a plurality of optical paths for collectively transmitting a combined image of an original object positioned to extend beyond the field angle of any one optical path, and means for providing an image surface, the refractive power of the object lenses producing a real image directly in the space between the object lens and the relay lens, and the refractive power of the relay lenses producing an erect image on the image surface.

13. The invention of claim 12 wherein the entrance refractive power of each of said object lenses is approximately equal to the exit refractive power of each of said relay lenses.

14. The invention of claim 12 wherein the exit refractive power of each of said object lenses is approximately equal to the entrance refractive power of each of said relay lenses.

15. The invention of claim 12 wherein the exit refractive power of each of said object lenses is approximately equal to the entrance refractive power of each of said relay lenses, and wherein the entrance refractive power of each of said object lenses is approximately equal to the exit refractive power of each of said relay lenses.

16. The invention of claim 12 wherein the entrance and exit refractive powers of the object and relay lenses are approximately the same.

17. The invention of claim 16 wherein the respective object and relay lenses are conjugate and the intermittent real image between the object and relay lenses is smaller than the object.

18. The invention of claim 16 wherein the entrance refractive power of each of said object lenses is approximately equal to the exit refractive power of each of said relay lenses.

19. The invention of claim 16 wherein the exit refractive power of each of said object lenses is approximately equal to the entrance refractive power of each of said relay lenses.

20. The invention of claim 16 wherein the exit refractive power of each of said object lenses is approximately equal to the entrance refractive power of each of said relay lenses, and wherein the entrance refractive power of each of said object lenses is approximately equal to the exit refractive power of each of said relay lenses.

21. The invention of claim 12 further including means for minimizing spherical aberration and field curvature including an aperture opening on each conjugate lens having a maximum effective area approximately no greater than 4 mm$^2$.

22. The invention of claim 12 wherein each object lens and relay lens is formed from a square glass bar.

23. The invention of claim 12 wherein each lens is made from a plastic having an index of refraction of approximately 1.57.

24. A compact erect optical imaging system for copying apparatus forming optical paths for transmitting images from an object to an image surface comprising:

means for supporting an original object to be copied;

a first plurality of object lenses having a thickness along their optical axes greater than the radius of curvature of their object surface, and a second plurality of relay lenses juxtaposed relative to the first plurality of object lenses to form array lens sets for transmitting a combined image from an object positioned to extend beyond the field angle of any one set of lenses, the refractive power of the object lenses producing a real image in the space between the object lens and the relay lens;

means for minimizing spherical aberration and field curvature including an aperture opening for each lens array having a maximum effective area approximately no greater than 4 mm², and means for providing an image surface.

25. The invention of claim 24 wherein each object lens and relay lens is formed from a glass bar.

26. The invention of claim 24 wherein the respective object and relay lenses are conjugate and the intermittent real image between the object and relay lenses is smaller than the object.

* * * * *

UNITED STATES PATENT AND TRADEMARK OFFICE
CERTIFICATE OF CORRECTION

PATENT NO. : 4,431,299
DATED : February 14, 1984
INVENTOR(S) : YOSHIYA MATSUI, ET AL.

It is certified that error appears in the above-identified patent and that said Letters Patent is hereby corrected as shown below:

On the Title Page, in the Abstract, line 1, insert --an-- before "original".

Column 2, line 32, delete "the" after "each".

Column 3, line 31, "elongate" should read --elongated--.

Column 5, line 26, "tone" should read --toner--.

Column 7, line 8, "know" should read --known--;

line 20, "$\{1 - e'_1\}_2\}$" should read --$\{1 - e'_1 \phi_2\}$--.

Column 8, line 16, "of" should read --to--; insert a comma after "8";

line 48, insert --are-- before "therefore".

Column 9, line 11, insert a comma after "beam".

UNITED STATES PATENT AND TRADEMARK OFFICE
CERTIFICATE OF CORRECTION

PATENT NO. : 4,431,299
DATED : February 14, 1984
INVENTOR(S) : YOSHIYA MATSUI, ET AL.

It is certified that error appears in the above-identified patent and that said Letters Patent is hereby corrected as shown below:

Column 10, lines 46-47, "symmetically" should read
--symmetrically--.

Column 11, line 11, "indica" should read --indices--.

Signed and Sealed this

Twenty-third Day of October 1984

[SEAL]

Attest:

Attesting Officer

GERALD J. MOSSINGHOFF

Commissioner of Patents and Trademarks